United States Patent [19]

Comer et al.

[11] 3,919,424
[45] Nov. 11, 1975

[54] BRONCHODILATOR PROCESS AND COMPOSITION

[75] Inventors: William T. Comer; Herbert R. Roth, both of Evansville, Ind.

[73] Assignee: Mead Johnson & Company, Evansville, Ind.

[22] Filed: Oct. 15, 1973

[21] Appl. No.: 406,524

Related U.S. Application Data

[62] Division of Ser. No. 229,202, Feb. 16, 1972, Pat. No. 3,801,631.

[52] U.S. Cl. .............................. 424/316; 424/321
[51] Int. Cl.$^2$ ................. A61K 31/205; A61K 31/18
[58] Field of Search ............................. 424/321, 316

[56] References Cited
UNITED STATES PATENTS 3,341,584  9/1967  Larsen et al. ..................... 424/330
3,634,511  1/1972  Howe et al. ....................... 424/324

OTHER PUBLICATIONS

Physician's Desk Reference, 25th Edition, 1971 p. 756, 1492–1493.
Larsen et al., Nature Vol. 203, No. 4951 pp. 1283–1284 9/19/64.
Uloth et al. J. Med. Chem. 9 pp. 88–97 (1966).
Larsen et al. J. Med. Chem. 10 pp. 462–472 (1967).

*Primary Examiner*—Norman A. Drezin
*Attorney, Agent, or Firm*—R. E. Carnahan; R. H. Uloth

[57] ABSTRACT

2'-Hydroxy-5'-[1-hydroxy-2-(2-methyl-1-phenyl-2-propylamino)-ethyl]methanesulfonanilide is a potent anorexigenic agent and orally active bronchodilator.

12 Claims, No Drawings

BRONCHODILATOR PROCESS AND COMPOSITION

CROSS REFERENCE TO RELATED APPLICATION

This application is a division of our co-pending application Ser. No. 229,202, filed Feb. 16, 1972, and now U.S. Pat. No. 3,801,631 patented Apr. 2, 1974.

FIELD OF THE INVENTION

This invention is in the field of drug, bio-affecting, and body treating compositions containing an organic active ingredient and deals specifically with the sulfonic acid amide 2'-hydroxy-5'-[1-hydroxy2-(2-methyl-1-phenyl-2-phenyl-2-propylamino)ethyl]methanesulfonanilide. This substance is referred to for convenience as MJ 9184. Its structural formula is given below.

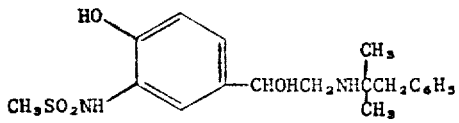

DESCRIPTION OF THE PRIOR ART

The following references relate to a broad genus of sulfonic acid amides of which the present substance is a newly synthesized member. It has a number of outstanding qualities as compared to its congeners.

1. Aubrey A. Larsen, et al., U.S. Pat. No. 3,341,584 patented Sept. 12, 1967.
2. A. A. Larsen, et al., Nature, Vol. 203, No. 4951, pp. 1283–1284, Sept. 19, 1964.
3. Robert H. Uloth, et al., *J. Med. Chem.*, 9, 88–97 (1966).
4. A. A. Larsen, et al., *J. Med. Chem.*, 10, 462–472 (1967).

Reference No. 4 deals specifically with the sulfonanilides most closely related structurally to MJ 9184. One substance from this series, 2'-hydroxy-5'-(1-hydroxy-2-isopropylaminoethyl)methanesulfonanilide (Compound No. 49 in the publication) was reported by the authors to be equivalent in potency to isoproterenol and to have been the subject of clinical evaluation as a bronchodilator. That substance has been referred to in the literature as MJ 1992 and as soterenol. Other members of the series are described by the authors as uterine relaxants, namely 2'-hydroxy5'-[1-hydroxy-2-(4-methoxyphenethylamino)propyl]methanesulfonanilide and 2'-hydroxy-5'-[1-hydroxy-2-(1-phenoxy-2-propylamino) propyl]methanesulfonanilide. The same three substances are also referred to as vasodilators, smooth muscle relaxants, and as bronchodilators at Column 24 of the Larsen, et al. patent cited above as reference No. 1.

SUMMARY OF THE INVENTION

The compound of the present invention is prepared according to the generalized method outlined in foregoing references Nos. 1 and 4. 5'-Bromoacetyl-2'-hydroxymethanesulfonanilide is caused to react in a neutral organic solvent with α-α-dimethylphenethylamine and the resulting aminoacetylsulfonanilide is hydrogenated over a catalyst to provide the desired compound. Detailed procedures are given in our U.S. Pat. No. 3,801,631 for this method. The invention relates to therapeutic bronchodilator and anorexigenic processes using the compound and its salts, and to pharmaceutical compositions adapted for use in the therapeutic processes.

In various animal tests that are used to measure bronchodilator activity, MJ 9184 is from 1 to 100 times as potent as isoproterenol on a dosage weight basis, and it has the very important advantage of being effective on oral administration. Isoproterenol is not used widely by ingestion because it is poorly absorbed. Of the 38 compounds having structures structures similar to MJ 9184 reported by Larsen, et al. in reference No. 4 cited above, 36 are either inactive or possess but small fractions of the β-adrenergic stimulant (bronchodilator) activity of MJ 9184. The 35 structurally related compounds of reference No. 3 are many orders of magnitude less potent. In addition, MJ 9184 is an anorexigenic agent having a potency on a dosage weight basis 10 times that of amphetamine. It is thus an outstandingly active drug, both as an anorexigenic and as a bronchodilator. It also possesses analgesic activity.

One test referred to for estimating bronchhodilator action in vitro in reference No. 4 involves removing the trachea from an adult guinea pig and suspending it in oxygenated salt solution at 37.5°C. Tissue activity is recorded kymographically or electronically and the effect of test compounds introduced into the bath at various concentrations is determined. Isoproterenol at concentrations of 4 to 6 nanograms per milliliter reduces the spontaneous tonus of the tracheal smooth muscle in vitro by 75%. The activity of other compounds relative to isoproterenol is then estimated by determining the concentrations thereof which cause a 75% reduction in spontaneous tonus. The rat uterus is used similarly in an isolated tissue test in vitro to compare the β-adrenergic stimulant ability of various bronchodilator drugs. These tests are referred to in footnotes (d) and (e) of Table IV of reference No. 4 cited above. Considering relative potencies with isoproterenol arbitrarily assigned a value of 1, in the guinea pig trachea test, MJ 9184 hydrochloride has a value of 4 to 7, and in the rat uterus test a value of 1 to 6.

In a more sophisticated animal model employing the anesthetized dog with pre-established and sustained bronchoconstriction induced by intravenous infusion of serotonin, MJ 9184 hydrochloride was found to be approximately 100 times more potent than isoproterenol when administered intraduodenally. In this test, pulmonary airway resistance was measured to assess bronchoconstriction and bronchodilation. Cardiovascular effects were simultaneously measured and found to be substantially less than those which are concomitant to the intraduodenal administration of equiactive bronchodilator amounts of isoproterenol. This in vivo animal test comparison is considered particularly significant since the sustained bronchoconstriction induced resembles asthma, and intraduodenal drug dosing of the anesthetized animal is similar to oral administration to a conscious animal. MJ 9184 had the further advantage of a rapid onset of action, less than 5 minutes, and a long duration of action.

The method of Randall, et al., *J. Pharmacol. Exper. Therap.*, 129, 163-171 (1960) is suitable for demonstration of the anorexic action of MJ 9184. This test involves the comparison of the food consumption of groups of fasted rats during a 4 hr. feeding period normally, and after intraperitoneal injection of a selected dose of the test drug prior to feeding. Amphetamine sulfate, a widely used anorexic substance, at a dose of 2.2 mg./kg. reduces food consumption to one half of normal. A 50% reduction of food consumption is achieved at a dose of 0.25 mg/kg. of MJ 9184 hydrochloride.

MJ 9184 hydrochloride is a relatively non-toxic substance, the $LD_{50}$ being in excess of 6000 mg./kg. for mice treated orally, greater than 4000 mg./kg. for rats treated orally, and 304 mg./kg. for mice treated intraperitoneally. Cats tolerate doses of 256 mg./kg. orally with only mild signs, but no lethality.

MJ 9184 and its pharmaceutically acceptable salts are administered to mammals subject to bronchoconstriction or to reduce the food intake of obese mammals at doses in the range of 2 mcg./kg. to 1 mg./kg. of body weight. The substances may be administered orally, parenterally, or by inhalation, the latter being of interest for bronchodilator use. The usual human dose is 2 to 20 mcg./kg. of body weight one to four times a day. Suitable dosage compositions are described below.

The present invention includes the pharmaceutically acceptable metal and acid addition salts of MJ 9184. Examples of metal salts include the sodium, potassium, calcium, magnesium, aluminum, and zinc salts. The sulfonanilide group is the acidic function which is neutralized in forming metal salts. Acid addition salts are formed at the amino group. Examples of pharmaceutically acceptable acid addition salts are the hydrochloride, hydrobromide, sulfate, phosphate, nitrate, mucate, isethionate, acetate, propionate, gluconate, benzoate, mesylate, tosylate, etc. Both types of salts can be prepared by reaction, preferably in solution of chemically equivalent amounts of MJ 9184 and the desired acid or base. They may be prepared by metathesis, preferably in a liquid reaction medium. A number of the acid addition salts including the hydrochloride salt have very low solubilities. The isethionate salt is notable for its water solubility and is particularly suited for parenteral formulations and for the preparation of solutions for nebulization. The term pharmaceutically acceptable used with reference to the salts implies a lack of toxicity in the doses required for the intended uses, and the possession of physical properties adapting the substances for one or more of the intended uses.

EXAMPLE A

Capsules — The following ingredients are blended in a twin shell blender and then loaded into No. 4 two-piece hard gelatin capsules. The batch size is sufficient for 1000 capsules and provides for a fill weight of 160 mg. supplying 0.5 mg. of active ingredient per capsule.

| | |
|---|---|
| 2'-Hydroxy-5'-[1-hydroxy-2-(2-methyl-1-phenyl-2-propylamino)ethyl]methane-sulfonanilide hydrochloride | 0.5 g. |
| Lactose, impalpable | 159.5 g. |

By adjusting the ingredient weights, capsules containing from 0.2 mg. to 2.0 mg. of active ingredient may be prepared in the same fashion.

EXAMPLE B

Tablets — The following ingredients when thoroughly blended in the dry state in a twin shell blender provide a composition suitable for tableting in a standard tablet press using a ¼ inch concave die. The batch size is sufficient for 1000 tablets containing 0.2 mg. of active ingredient per tablet.

| | |
|---|---|
| 2'-Hydroxy-5'-[1-hydroxy-2-(2-methyl-1-phenyl-2-propylamino)ethyl]methane-sulfonanilide hydrochloride | 0.2 g. |
| Sucrose, Pregranulated for direct compression | 77.3 g. |
| Corn starch | 2.0 g. |
| Crystalline cellulose | 20.0 g. |
| Magnesium stearate | 0.5 g. |

EXAMPLE C

Solution for Nebulization — The following ingredients are used to prepare a solution which is clarified by filtration and then filled into 10 ml. amber glass bottles.

| | |
|---|---|
| 2'-Hydroxy-5'-[1-hydroxy-2-(2-methyl-1-phenyl-2-propylamino)ethyl]methane-sulfonanilide isethionate | 13.33 g. |
| Sodium bisulfite | 2.00 g. |
| Chlorobutanol, USP | 5.00 g. |
| Propylene glycol | 50.00 g. |
| Sodium saccharin | 1.00 g. |
| Citric acid, anhydrous | 1.92 g. |
| Purified water | qs 1000 ml. |
| Sodium hydroxide | qs pH 3.75 |

The foregoing solution is suitable for administration in conventional nebulization equipment adapted for administration of drugs by inhalation. This solution contains 1.33% by weight of the isethionate salt equivalent to 1% by weight of MJ 9184 base. The concentration of active ingredients may be varied to provide similar solutions containing an amount of the isethionate salt equivalent to from 0.25 to 2% by weight of MJ 9184 base.

EXAMPLE D

Aerosol Dispenser — A solution of 2.0 g. of 2'-hydroxy-5'-[1-hydroxy-2-(2-methyl-1-phenyl-2-propylamino)ethyl]methanesulfonanilide isethionate in 373.5 g. of absolute ethanol and 34.5 g. of distilled water is prepared and used with a propellant blend of 118.0 g. of dichlorodifluoromethane and 472.0 g. of dichlorotetrafluoroethane to fill aerosol containers to a total fill weight of 17.5 g. each. The containers are equipped with pharmaceutical grade metering valves of 50 mg. delivery capacity. Each actuation thus releases 100 mcg. of MJ 9184 isethionate equivalent to 75 mcg. of MJ 9184 base.

What is claimed is:

1. A brochodilator composition in dosage unit form suitable for administration to a mammal comprising a liquid or solid pharmaceutical carrier and a non-toxic bronchodilator effective dosage amount of a compound selected from the group consisting of 2'-hydroxy-5'-[1-hydroxy-2-(2-methyl-1-phenyl-2-propylamino)ethyl]-methanesulfonanilide and the pharmaceutically acceptable acid addition and metal salts thereof.

2. The bronchodilator composition of claim 1 wherein said compound is a pharmaceutically acceptable acid addition salt of said 2'-hydroxy-5'-[1- hydroxy-2-(2-methyl-1-phenyl-2-propylamino)ethyl]-methanesulfonanilide.

3. The bronchodilator composition of claim 2 wherein said acid addition salt is the hydrochloride salt.

4. The bronchodilator composition of claim 2 wherein said acid addition salt is the isethionate salt.

5. The bronchodilator composition of claim 2 wherein said dosage unit is a capsule or tablet containing 0.2 mg. to 2.0 mg. of said compound.

6. The bronchodilator composition of claim 2 wherein said dosage unit form is an aqueous solution for nebulization and said acid addition salt is the isethionate present in said solution in an amount equivalent to from 0.25 to 2% by weight of said 2'-hydroxy-5'-[1-hydroxy-2-(2-methyl-1-phenyl-2-propylamino)ethyl]-methanesulfonanilide.

7. A method of relieving bronchospasm in a mammal suffering therefrom which comprises administering to said mammal a non-toxic effective dose to relieve bronchospasm of a compound selected from the group consisting of 2'-hydroxy-5'-[1-hydroxy-2--methyl-1-phenyl-2-propylamino)ethyl]methanesulfonanilide and the pharmaceutically acceptable acid addition and metal salts thereof.

8. The process of claim 7 wherein a 2'-hydroxy-5'-[1-hydroxy-2-(2-methyl-1-phenyl-2-propylamino)ethyl]methanesulfonanilide pharmaceutically acceptable acid addition salt is employed.

9. The process of claim 7 wherein 2'-hydroxy-5'-[1-hydroxy-2-(2-methyl-1-phenyl-2-propylamino)ethyl]methanesulfonanilide is employed.

10. The process of claim 8 wherein 2'-hydroxy-5'-[1-hydroxy-2-(2-methyl-1-phenyl-2-propylamino)ethyl]methanesulfonanilide hydrochloride is employed.

11. The process of claim 8 wherein 2'-hydroxy-5'-[1-hydroxy-2-(2-methyl-1-phenyl-2-propylamino)ethyl]methanesulfonanilide isethionate is employed.

12. The method of claim 7 wherein said dosage amount is in the range of 2 mcg. to 1 mg. of said compound per kilogram of body weight of said mammal.

* * * * *

UNITED STATES PATENT OFFICE
CERTIFICATE OF CORRECTION

PATENT NO. : 3,919,424

DATED : November 11, 1975

INVENTOR(S) : William T. Comer; Herbert R. Roth

It is certified that error appears in the above-identified patent and that said Letters Patent are hereby corrected as shown below:

Correct the chemical name appearing at the following locations to read as follows--2'-hydroxy-5'-[1-hydroxy-2-(2-methyl-1-phenyl-2-propylamino)ethyl]methanesulfonanilide--.

Column 5, line 21 through Column 6, line 2.

Column 6, line 4 through Column 6, line 7.

Column 6, line 9 through Column 6, line 12.

Column 6, line 13 through Column 6, line 16.

Column 6, line 17 through Column 6, line 21.

Column 1, line 14 through Column 1, line 16.

Signed and Sealed this seventeenth Day of February 1976

[SEAL]

Attest:

RUTH C. MASON
Attesting Officer

C. MARSHALL DANN
Commissioner of Patents and Trademarks